United States Patent
Noguchi et al.

(10) Patent No.: US 8,690,252 B2
(45) Date of Patent: Apr. 8, 2014

(54) HEADREST POSITION ADJUSTING DEVICE AND HEADREST POSITION ADJUSTING METHOD

(75) Inventors: Yuki Noguchi, Sakura (JP); Yuichiro Yamaguchi, Sakura (JP); Takuya Osaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 109 days.

(21) Appl. No.: 13/259,849

(22) PCT Filed: Apr. 9, 2010

(86) PCT No.: PCT/JP2010/056456
§ 371 (c)(1),
(2), (4) Date: Oct. 18, 2011

(87) PCT Pub. No.: WO2010/117061
PCT Pub. Date: Oct. 14, 2010

(65) Prior Publication Data
US 2012/0032488 A1  Feb. 9, 2012

(30) Foreign Application Priority Data
Apr. 10, 2009 (JP) ................................. 2009-096105

(51) Int. Cl.
*A47C 7/36* (2006.01)

(52) U.S. Cl.
USPC ........................ 297/391; 297/410; 297/216.12

(58) Field of Classification Search
USPC .................................... 297/410, 391, 216.12
See application file for complete search history.

(56) References Cited

U.S. PATENT DOCUMENTS

| 5,848,661 | A   | * | 12/1998 | Fu ................................. 180/273 |
| 6,402,195 | B1  | * | 6/2002  | Eisenmann et al. .......... 280/735 |
| 7,967,377 | B2  | * | 6/2011  | Truckenbrodt et al. ..... 297/217.3 |
| 2007/0176473 | A1 | * | 8/2007  | Sakai et al. ............. 297/216.12 |
| 2008/0004775 | A1 |   | 1/2008  | Iyoda |

FOREIGN PATENT DOCUMENTS

JP        64-011511  A       1/1989
(Continued)

OTHER PUBLICATIONS

International Search Report of PCT/JP2010/056456, mailing date May 18, 2010.

*Primary Examiner* — Sarah B McPartlin
(74) *Attorney, Agent, or Firm* — Westerman, Hattori, Daniels & Adrian, LLP

(57) ABSTRACT

To automatically adjust the position of a headrest accurately with a simple configuration while preventing an unnecessary movement of the headrest, a headrest position adjusting device 100 includes a capacitance sensor unit 10 and a drive motor unit 30. The capacitance sensor unit 10 includes, for example, a plurality of sensing electrodes 11 to 15 and a detecting circuit 20. The detecting circuit 20 includes a plurality of capacitance sensing circuits 21 to 25 connected one-to-one to the sensing electrodes 11 to 15, and an arithmetic processing circuit 28. The drive motor unit 30 includes a motor driving circuit and a drive motor. The detecting circuit 20 judges whether or not the smallest capacitance value among detected capacitance values is equal to or larger than a predetermined threshold, performs a position adjusting operation for a headrest 43 when the smallest capacitance value is equal to or larger than the predetermined threshold, and stops the headrest 43 or moves the headrest 43 to a predetermined position when the smallest capacitance value is smaller than the predetermined threshold.

9 Claims, 8 Drawing Sheets

(56) References Cited

FOREIGN PATENT DOCUMENTS

| | | |
|---|---|---|
| JP | 64-011512 A | 1/1989 |
| JP | 11-180200 A | 7/1999 |
| JP | 2000-309242 A | 11/2000 |
| JP | 2007-131026 A | 5/2007 |
| JP | 2007-203759 A | 8/2007 |
| JP | 2008265644 A | 11/2008 |
| JP | 2009-067096 A | 4/2009 |
| KR | 10-0832921 B1 | 5/2008 |
| WO | 2008-133291 A1 | 11/2008 |

* cited by examiner

HEADREST POSITION ADJUSTING DEVICE AND HEADREST POSITION ADJUSTING METHOD

TECHNICAL FIELD

The present invention relates to a headrest position adjusting device and a headrest position adjusting method for adjusting the position of a headrest provided on a seat of a vehicle such as an automobile, etc., and particularly to a headrest position adjusting device and a headrest position adjusting method capable of automatically adjusting the position of a headrest to an appropriate state by preventing an unnecessary movement of the headrest.

BACKGROUND ART

Conventionally, a headrest drive control device (for example, see Patent Document 1 (pp. 2-6, FIGS. 1-4)) is known as a technique for adjusting the position of a headrest provided on a seat of a vehicle such as an automobile, etc. The headrest drive control device monitors a capacitance between a pair of electrodes embedded in the ceiling of the vehicle and in the headrest, and adjusts the position of the headrest by judging presence or absence of a head based on the amount of change in the capacitance which occurs when scanning is performed by driving the headrest upward from a lower end.

A headrest driving device (for example, see Patent Document 2 (pp. 3-8, FIGS. 1-4)) adjusts the position of a headrest to a place at which outputs from four capacitor plates embedded in the headrest are balanced.

A headrest adjusting device (for example, see Patent Document 3 (pp. 3-6, FIGS. 1-5)) monitors a capacitance between one electrode arranged in a headrest and a head, and adjusts the position of the headrest by judging presence or absence of a head based on the amount of change in the capacitance which occurs when scanning is performed by driving the headrest upward and downward.

A device for adjusting a headrest of a vehicle (for example, see Patent Document 4 (pp. 2-3, FIGS. 1-3)) adjusts the position of a headrest by using two or three capacitor plates arranged in the headrest and measuring a capacitance between a head and the capacitor plates.

CONVENTIONAL ART DOCUMENTS

Patent Documents

Patent Document 1: JPS64-11511A
Patent Document 2: JPS64-11512A
Patent Document 3: JPH11-180200A
Patent Document 4: JP2000-309242A

DISCLOSURE OF INVENTION

Problem to be Solved by the Invention

However, if the devices disclosed in above-identified Patent Documents 1 to 4 are used in order to adjust the position of the headrest by making the headrest constantly follow the head height-wise, a position adjusting operation might be performed even when the distance between the head and the headrest is large. In this case, it is inferred that the output value of the capacitance is small, and erroneous detections often occur, to make it difficult to perform highly accurate position adjustment.

There is another problem; if the headrest gets operated when the distance between the head and the headrest is large, unnecessary power consumption occurs.

To achieve the problems of the conventional techniques described above, an object of the present invention is to provide a headrest position adjusting device and a headrest position adjusting method which are, with a simple configuration, capable of automatically adjusting the position of a headrest accurately by, in particular, preventing an unnecessary movement of the headrest.

Means for Solving the Problem

To solve the above-described problems and achieve the object, a headrest position adjusting device according to the present invention includes: a plurality of sensing electrodes which are provided in a headrest provided on a seat of a vehicle for sensing capacitances between a head of a human body sitting on the seat and the headrest, the sensing electrodes being provided side by side along a height direction of the headrest; a detecting circuit which detects a height position of the head based on sensing signals from the plurality of sensing electrodes; and position adjusting means which adjusts a position of the headrest with respect to the head based on the height position of the head in accordance with a detection result from the detecting circuit; wherein the position adjusting means adjusts the position of the headrest when a distance between the headrest and the head is equal to or shorter than a predetermined distance, and stops the headrest or moves the headrest to a predetermined position when the distance between the headrest and the head is longer than the predetermined distance.

For example, the detecting circuit may be configured to judge that the distance between the headrest and the head is equal to or shorter than the predetermined distance when a capacitance value of the sensing electrode from which a smallest capacitance value is detected among the plurality of sensing electrodes is equal to or larger than a predetermined threshold, and judge that the distance between the headrest and the head is longer than the predetermined distance when the capacitance value of the sensing electrode is smaller than the predetermined threshold.

The headrest position adjusting device may further include distance measuring means which measures the distance between the headrest and the head, and for example, the detecting circuit may recognize the distance between the headrest and the head based on a value measured by the distance measuring means.

For example, each of the sensing electrodes may be formed in the headrest at a portion closer to a front surface of the headrest, and have a rectangular strip shape having its longer dimension extend in a width direction perpendicular to the height direction.

A headrest position adjusting method according to the present invention includes: a sensing step of sensing capacitances between a head of a human body sitting on a seat of a vehicle and a headrest provided on the seat by means of a plurality of sensing electrodes which are provided in the headrest side by side along a height direction of the headrest; a detecting step of detecting a height position of the head based on sensing signals sensed in the sensing step; and a position adjusting step of adjusting a position of the headrest with respect to the head based on the height position of the head in accordance with a detection result detected in the detecting step, wherein the position adjusting step adjusts the position of the headrest when a distance between the headrest and the head is equal to or shorter than a predetermined distance, and stops the headrest or moves the headrest to a predetermined position when the distance between the headrest and the head is longer than the predetermined distance.

For example, the detecting step may judge that the distance between the headrest and the head is equal to or shorter than the predetermined distance when a capacitance value of the sensing electrode from which a smallest capacitance value is detected in the detecting step among the plurality of sensing electrodes is equal to or larger than a predetermined threshold, and judge that the distance between the headrest and the head is longer than the predetermined distance when the capacitance value of the sensing electrode is smaller than the predetermined threshold.

The headrest position adjusting method may further include a distance measuring step of measuring the distance between the headrest and the head, and for example, the detecting step may recognize the distance between the headrest and the head based on a measurement value measured in the distance measuring step.

Effect of the Invention

According to the present invention, it is possible to provide a headrest position adjusting device and a headrest position adjusting method which are, with a simple configuration, capable of automatically adjusting the position of a headrest accurately by, in particular, preventing an unnecessary movement of the headrest.

BEST MODE FOR CARRYING OUT THE INVENTION

Preferred embodiments of a headrest position adjusting device and a headrest position adjusting method according to the present invention will now be explained with reference to the attached drawings.

Figure 1:
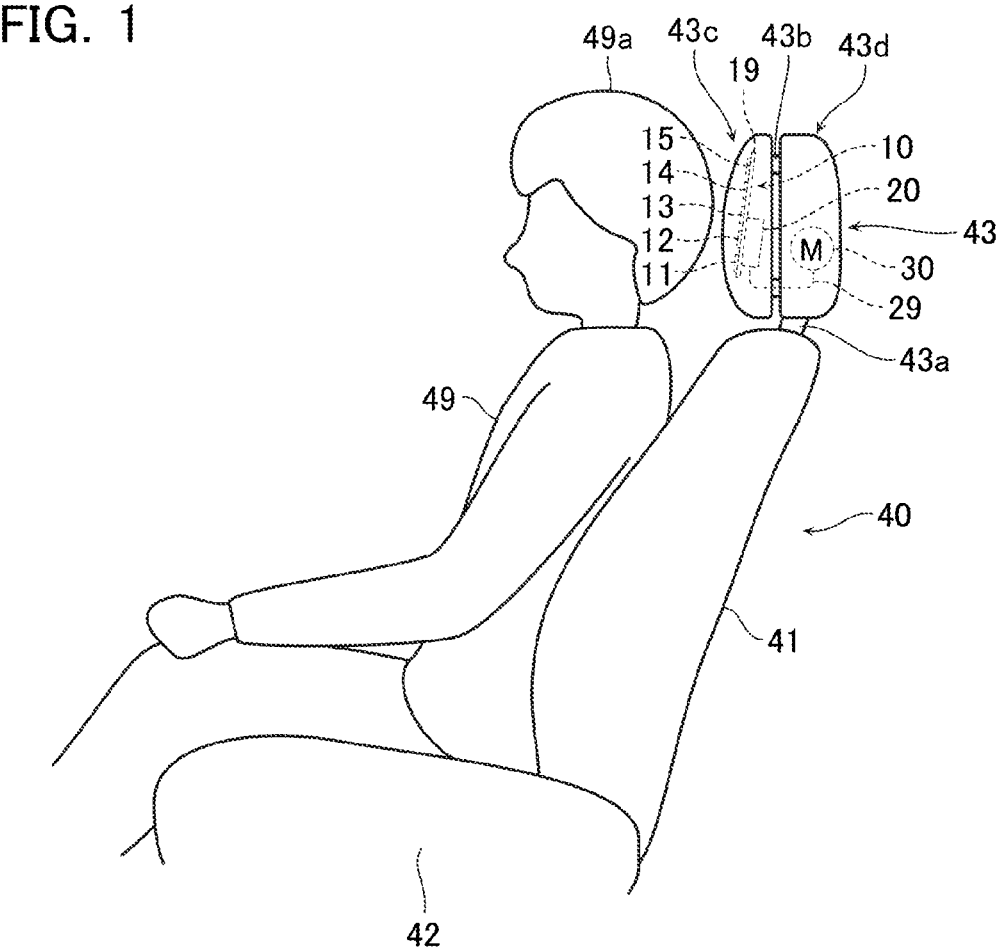
FIG. 1 is a schematic diagram showing an example of a seat of a vehicle mounted with a headrest position adjusting device according to one embodiment of the present invention.
Figure 2:
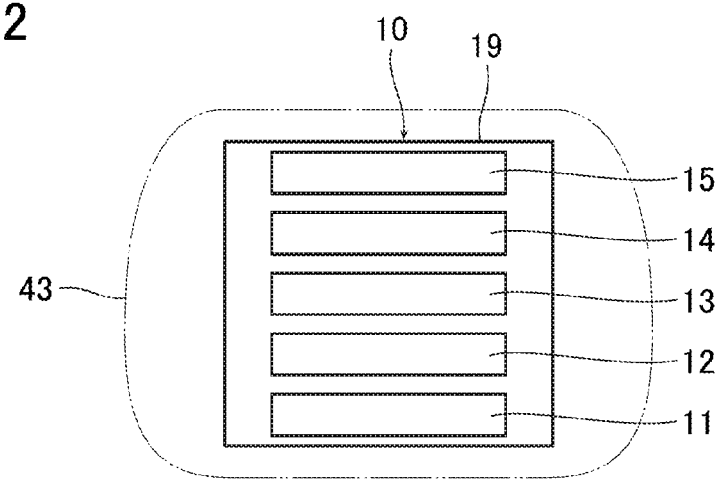
FIG. 2 is an explanatory diagram showing an example of how a portion of a headrest position adjusting device is arranged in a headrest according to one embodiment of the present invention.

FIG. 1 is a schematic diagram showing an example of a seat of a vehicle mounted with a headrest position adjusting device according to one embodiment of the present invention. FIG. 2 is an explanatory diagram showing an example of how a portion of the headrest position adjusting device is arranged in a headrest.

As shown in FIG. 1 and FIG. 2, a headrest position adjusting device 100 is provided in a seat 40 of a vehicle, etc., and includes, for example, a capacitance sensor unit 10 disposed in a headrest front portion 43c which constitutes a part of a headrest 43 of the seat 40, and a drive motor unit 30 disposed in a headrest back portion 43d which constitutes another part of the headrest 43. The capacitance sensor unit 10 and the drive motor unit 30 are electrically connected to each other through, for example, a harness 29.

For example, the headrest front portion 43c is connected to the headrest back portion 43d through a support shaft 43b to be freely movable in the frontward-rearward direction of the vehicle. For example, the headrest back portion 43d is connected to a backrest (back seat) 41 of the seat 40 through a support shaft 43a to be freely movable in the upward-downward direction (the height direction of the headrest 43) and leftward-rightward direction of the vehicle.

In the present example, the capacitance sensor unit 10 includes, for example, a plurality of sensing electrodes 11 to 15 which are formed on one surface (front surface) of a substrate 19, and a detecting circuit 20 which is formed (mounted) on the other surface (back surface) of the substrate 19. The capacitance sensor unit 10 detects capacitance values which are based on capacitances from the sensing electrodes 11 to 15, detects a head 49a of a human body 49 sitting on a sitting portion 42 of the seat 40, and detects, for example, an electrode-head distance indicating the distance between the headrest 43c and the head 49a. Other than this, the electrode-head distance can be measured with the use of a known infrared-type sensor and a known ultrasonic-type sensor.

The substrate 19 is made of, for example, a flexible printed board, a rigid substrate, or a rigid flexible substrate. The plurality of sensing electrodes 11 to 15 is made of a conductive material such as copper, a copper alloy, aluminum, etc. patterned on the substrate 19 made of an insulating material such as polyethylene terephthalate (PET), polyethylene naphthalate (PEN), polyimide (PI), polyamide (PA), an epoxy resin, etc. Other than this, the plurality of sensing electrodes 11 to 15 may be made of a material such as an electric wire, a conductive film, etc.

The plurality of sensing electrodes 11 to 15 are provided in the headrest front portion 43c at a portion close to the front surface thereof, formed in a rectangular strip shape having its longer dimension extend in the width direction (leftward-rightward direction) of the headrest 43 perpendicular to the height direction of the headrest 43, and arranged side by side with their widths lined up along the height direction of the headrest 43. Electrode numbers 1 to 5 (N1 to N5 or ch1 to ch5) are allocated to the plurality of sensing electrodes 11 to 15 respectively. In the present example, there are provided five electrodes, but it is only necessary to provide such a number of electrodes as are necessary for sensing a capacitance between the head 49a of the human body 49 sitting on the seat 40 and the headrest 43 while the headrest 43 is at rest. For example, it is enough if there are provided two or more electrodes.

As will be described in detail later, when the smallest capacitance value among capacitance values, which are detected by all of the sensing electrodes 11 to 15 for the capacitance sensor unit 10 to detect the head 49a, is equal to or larger than a predetermined threshold, the headrest position adjusting device 100 calculates the height position of the head 49a based on all of the capacitance values, and adjusts the height-direction position of the headrest 43 based on the calculated height position.

On the other hand, when the smallest capacitance value among the capacitance values is smaller than the predetermined threshold, the headrest position adjusting device 100 stops the headrest 43. Other than this, when the sensor unit 10 is an infrared-type sensor or an ultrasonic-type sensor, the headrest position adjusting device 100 may adjust the position of the headrest 43 when the value of a detection signal output by the sensor unit 10 is equal to or larger than a predetermined threshold, and may stop the headrest 43 or move it to a predetermined position when the value of the detection signal is smaller than the predetermined threshold.

That is, this means that the position of the headrest 43 is adjusted when the distance between the headrest 43 and the head 49a is equal to or shorter than a predetermined distance, while the headrest 43 is stopped or moved to a predetermined position when the distance between the headrest 43 and the head 49a is longer than the predetermined distance.

Figure 3:
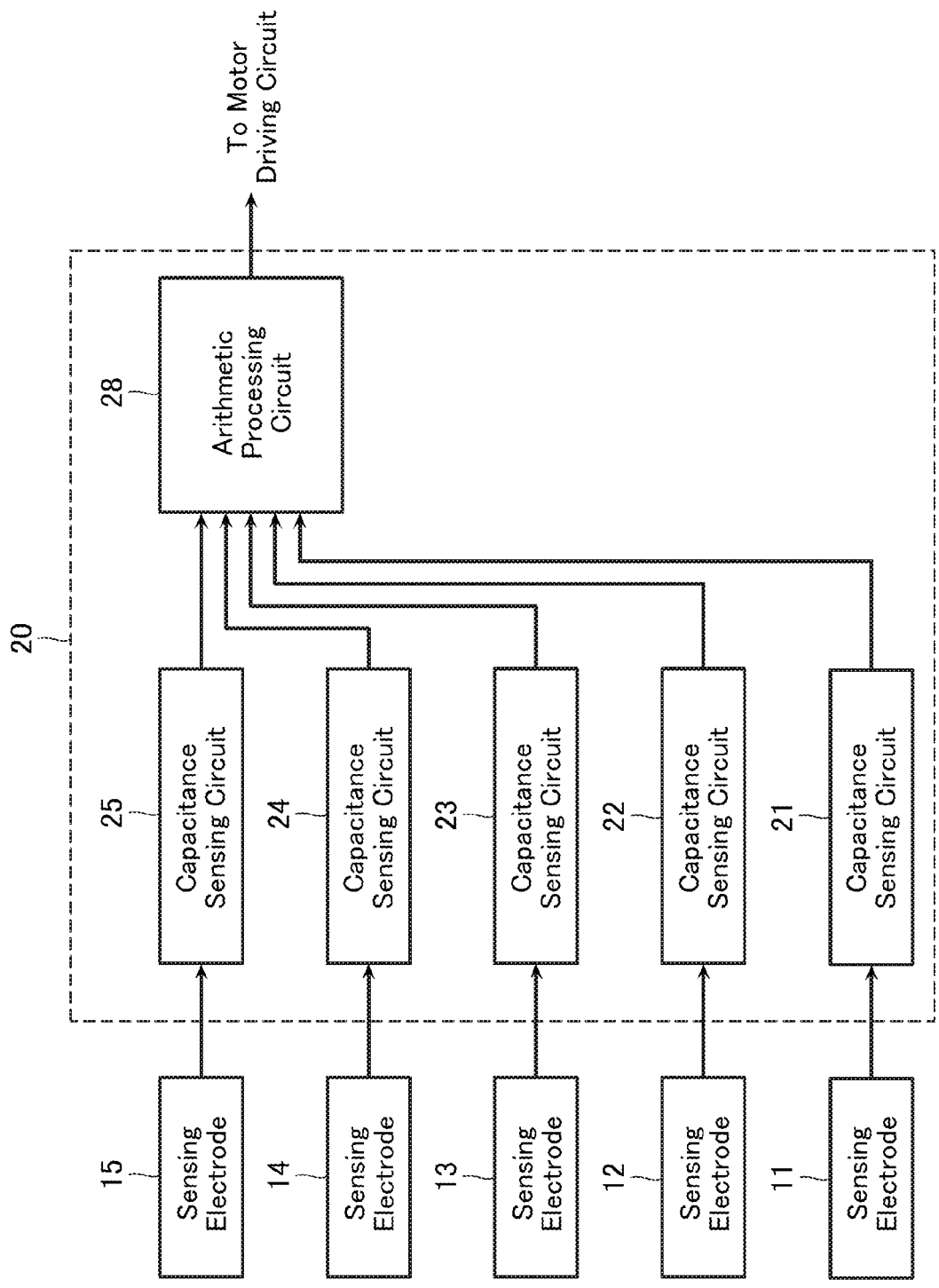
FIG. 3 is a block diagram showing an example of the whole configuration of the headrest position adjusting device.

As shown in FIG. 3, the detecting circuit 20 of the capacitance sensor unit 10 includes, for example, a plurality of capacitance sensing circuits 21 to 15 which are connected one-to-one to the sensing electrodes 11 to 15 and output information indicating capacitances sensed by the sensing circuits 11 to 15. The detecting circuit 20 also includes an arithmetic processing circuit 28 which is connected to the capacitance sensing circuits 21 to 15, calculates the electrode-head distance based on the capacitances indicated by the information output by the capacitance sensing circuits 21 to 15, calculates the height position of the head 49a by comparing the capacitances, and outputs information indicating the calculation results to a motor driving circuit (unillustrated) of the drive motor unit 30.

Figure 4:
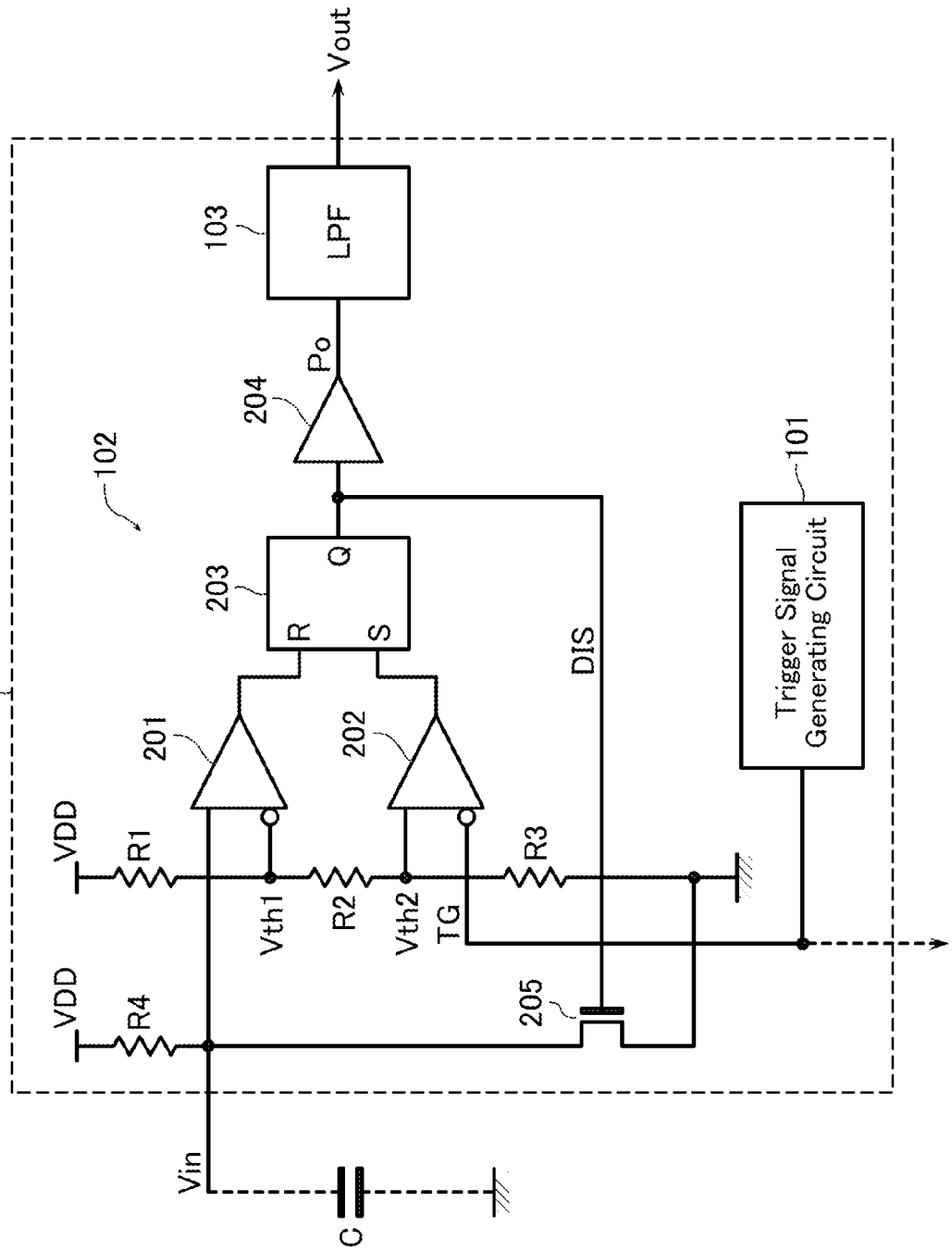
FIG. 4 is a block diagram showing an example of the configuration of a capacitance sensing circuit of the headrest position adjusting device.

Here, as shown in FIG. 4, each capacitance sensing circuit 21 (22 to 25) has a duty ratio which changes in accordance with a capacitance C, and for example, includes a trigger signal generating circuit 101 which outputs a trigger signal TG having a fixed period, a timer circuit 102 which outputs a pulse signal Po having a duty ratio which changes in accordance with the level of the capacitance C connected to an input terminal, and a low-pass filter (LPF) 103 which smoothes the pulse signal Po.

For example, the timer circuit 102 includes two comparators 201 and 202, an RS flip-flop circuit (hereinafter referred to as "RS-FF") 203 which receives the outputs of these comparators 201 and 202 at its reset terminal R and its set terminal S respectively, a buffer 204 which outputs an output DIS of the RS-FF 203 to the LPF 103, and a transistor 205 which is controlled between on and off according to the output DIS of the RS-FF 203.

Figure 5:
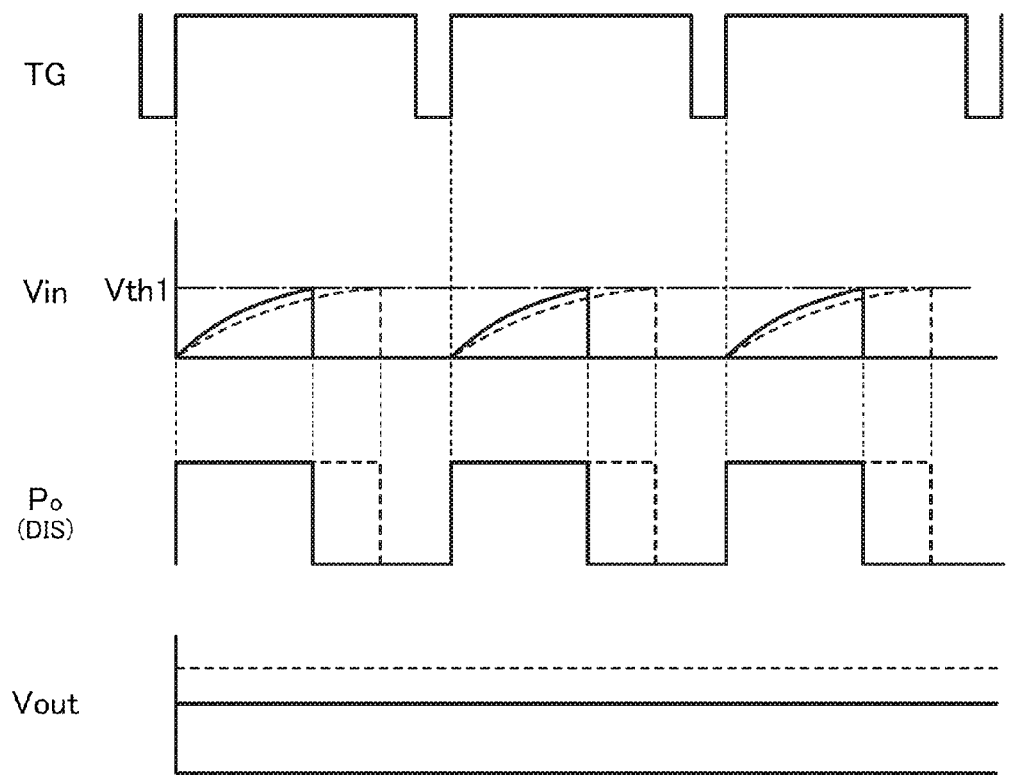
FIG. 5 is an operation waveform chart showing an example of operation waveforms of a detecting circuit of the headrest position adjusting device.

The comparator 202 compares such a trigger signal TG as shown in FIG. 5 which is output from the trigger signal generating circuit 101 with a predetermined threshold Vth2 divided by resistors R1, R2, and R3, and outputs a set pulse synchronized with the trigger signal TG This set pulse sets the Q output of the RS-FF 203.

The Q output as a discharge signal DIS turns off the transistor 205, and electrically charges between the sensing electrode 11 (12 to 15) and the ground (GND) at a speed defined by a time constant set by the to-ground capacitance C of the sensing electrode 11 (12 to 15) and a resistor R4 connected between the input terminal and a power supply line. Accordingly, the potential of an input signal Vin rises at a speed defined by the capacitance C.

When the input signal Vin exceeds a threshold Vth1 defined by the resistors R1, R2, and R3, the output of the comparator 201 is inverted, thereby inverting the output of the RS-FF 203. As a result, the transistor 205 is turned on, and the charges accumulated in the sensing electrode 11 (12 to 15) are discharged through the transistor 205.

Hence, the timer circuit 102 outputs a pulse signal Po which, as shown in FIG. 5, oscillates at a duty ratio that is based on the capacitance C between the sensing electrode 11 (12 to 15) and the head 49a of the human body 49 coming close to the sensing electrode. The LPF 103 outputs a direct-current sensing signal Vout shown in FIG. 5 by smoothing the pulse signal Po. In FIG. 5, a waveform indicated by a solid line and a waveform indicated by a dotted line show that the former has a smaller capacitance than that of the latter, and, for example, the latter represents a condition that an object is coming close.

The drive motor unit 30 includes a motor driving circuit which changes the position of the headrest 43 by controlling an unillustrated drive motor based on a control signal which is based on calculation results of the arithmetic processing circuit 28 which has performed calculations in the detecting circuit 20 of the capacitance sensor unit 10 based on sensing signals Vout from the capacitance sensing circuits 21 to 25. The drive motor unit 30 also includes a drive motor which actually moves the position of the headrest 43 under the control of the motor driving circuit.

In the present example, the drive motor unit 30 adjusts at least the headrest back portion 43dc to an appropriate position by causing a movement (upward-downward movement) of the headrest back portion in the upward direction or downward direction of the vehicle based on an output result from the capacitance sensor unit 10. That is, by using the electrode-head distance included in the measurement result, the drive motor unit 30 compares the smallest capacitance value among the capacitance values included in the output result with a predetermined threshold, and when the capacitance value is equal to or larger than the predetermined threshold, causes an upward-downward movement of the headrest back portion 43d.

Specifically, the drive motor is configured to drive the support shaft 43b of the headrest front portion 43c to freely move in the frontward-rearward direction and drive the support shaft 43a of the headrest back portion 43d to freely move in the upward-downward direction and the leftward-rightward direction (i.e., to make an upward-downward/leftward-rightward movement). Hence, the headrest position adjusting device 100 according to the present example can adjust the headrest 43 to an appropriate position for the head 49a by causing not only an upward-downward movement of the headrest 43 described above but an frontward-rearward/leftward-rightward movement thereof.

The headrest position adjusting device 100 configured as described above can perform position adjustment for the headrest 43 based on a measurement result which includes the distance (electrode-head distance) between the head 49a and the headrest 43 (headrest front portion 43c), which is obtained by the sensing electrodes 11 to 15 of the capacitance sensor unit 10 sensing capacitances C with respect to the head 49a and the detecting circuit 20 performing comparison operation between the smallest value of these output values and a predetermined threshold.

Figure 6:
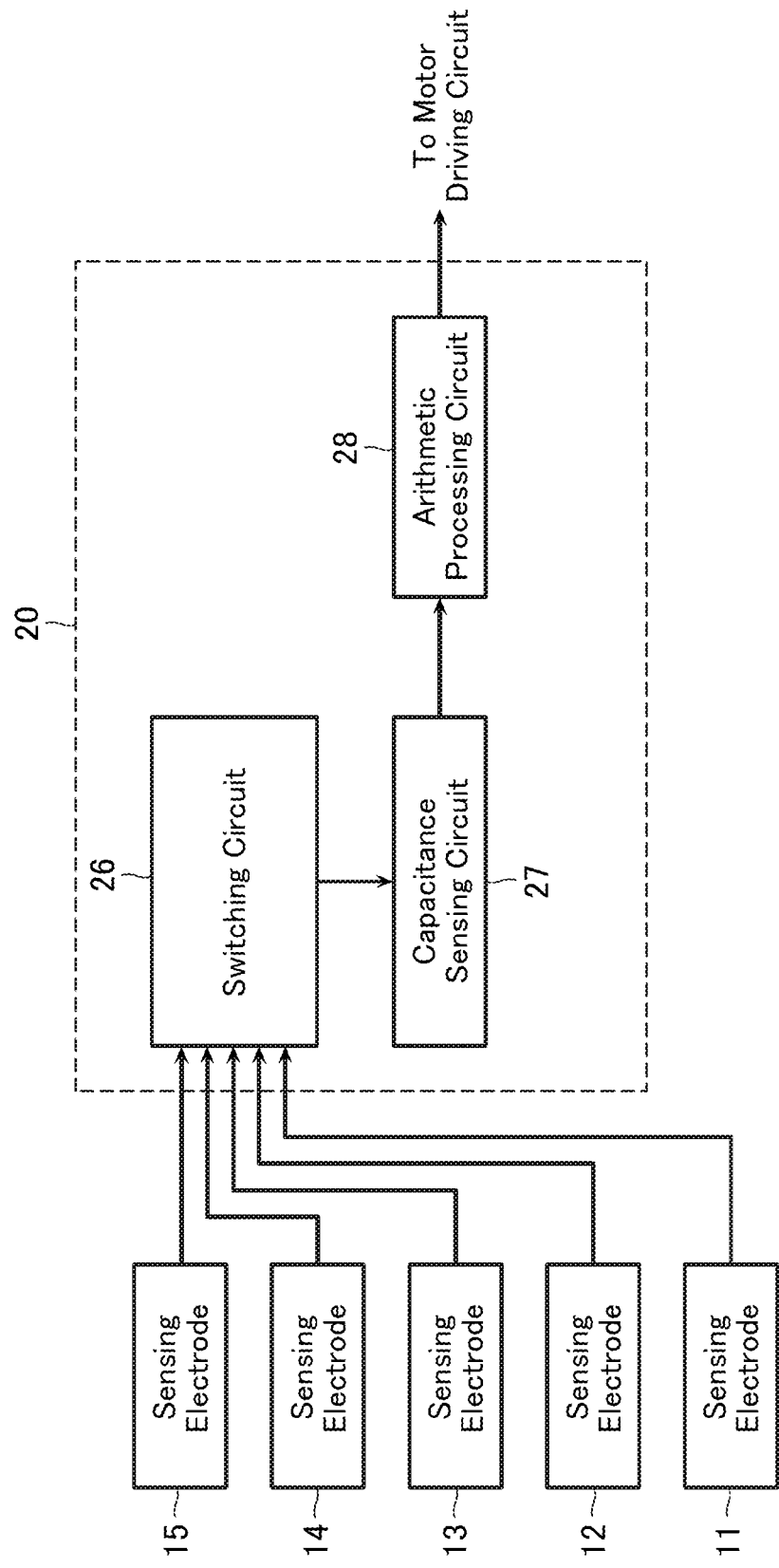
FIG. 6 is a block diagram showing another example of the whole configuration of a headrest position adjusting device according to one embodiment of the present invention.

FIG. 6 is a block diagram showing another example of a whole configuration of a headrest position adjusting device according to one embodiment of the present invention. In the following description, any portions that are the same as those already explained will be denoted by the same reference numerals and explanation thereof will not be provided. As shown in FIG. 6, the detecting circuit 20 of the capacitance sensor unit 10 includes a switching circuit 26 connected to the sensing electrodes 11 to 15, a capacitance sensing circuit 27 which outputs information indicating a capacitance sensed by any of the sensing electrodes 11 to 15 which are to be connected to the capacitance sensing circuit 27 intertemporally through the switching circuit 26, and an arithmetic processing circuit 28 which calculates the electrode-head distance, etc. based on the information output by the capacitance sensing circuit 27 and outputs information indicating the calculation results to the motor driving circuit of the drive motor unit 30.

This configuration of the detecting circuit 20 allows the capacitance sensor unit 10 to be configured with a minimum number of capacitance sensing circuits, and enables the electrode-head distance, etc. to be obtained based on a result of sequentially scanning the capacitances of the respective sensing electrodes 11 to 15 which are switched among them by the switching circuit 26.

Figure 7:
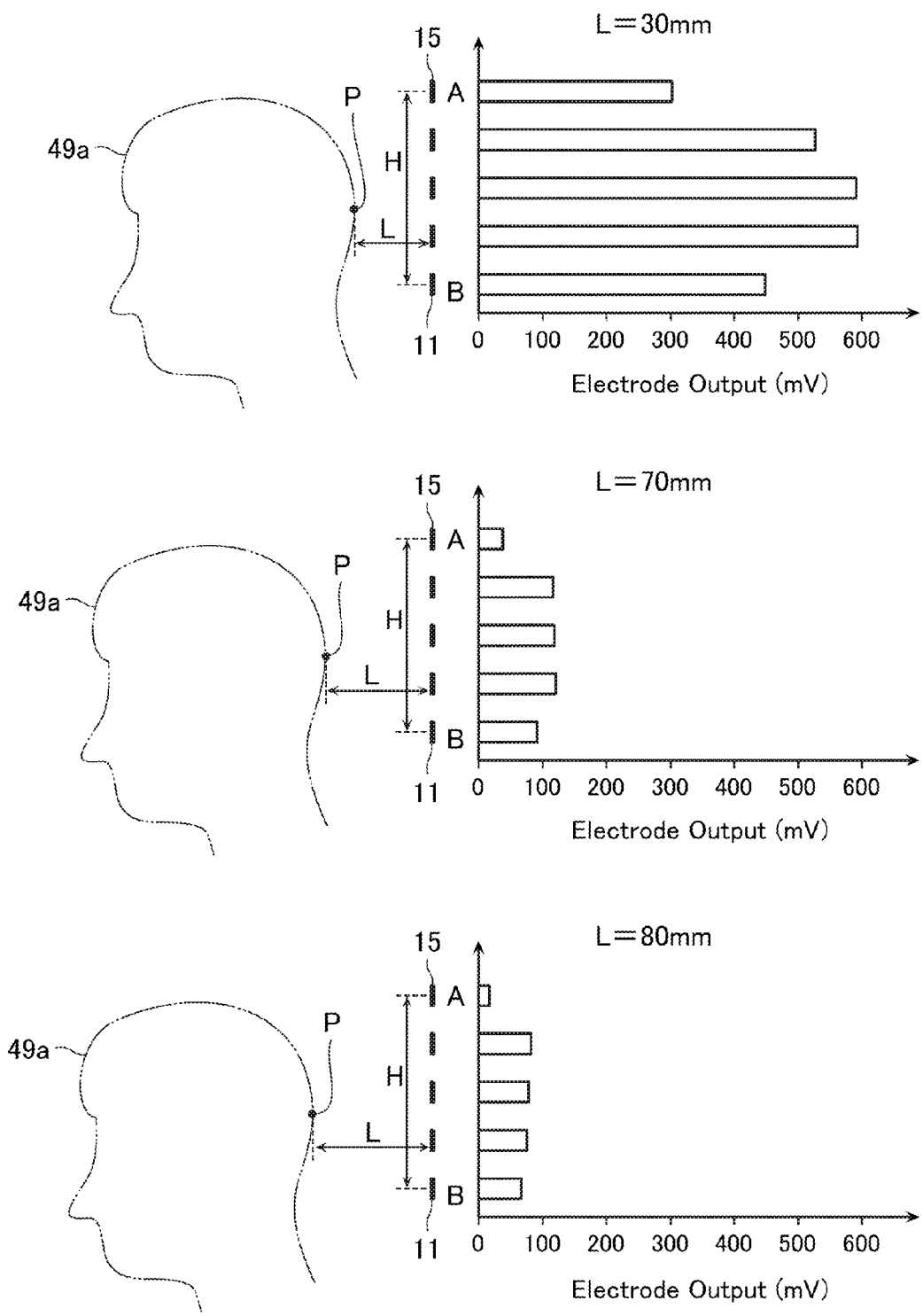
FIG. 7 are explanatory diagrams showing examples of outputs of sensing electrodes of the headrest position adjusting device.

FIG. 7 are explanatory diagrams showing examples of outputs from the sensing electrodes of the headrest position adjusting device according to one embodiment of the present invention. As shown in FIG. 7(a), when the height-direction center position of the head 49a is defined as P and the electrode-head distance from this center position P, which exists within an electrode-electrode distance H, to each of the sensing electrodes 11 to 15 is defined as L, output values will be as follows.

That is, when the electrode-head distance L is 30 mm and the vicinity of the side-by-side arrangement direction center of the sensing electrodes 11 to 15 (or the vicinity of the center of the headrest front portion 43c) and the center position P of the head 49a face each other substantially horizontally, the output value of the sensing electrode 12 or the sensing electrode 13 is the largest output value among the output values of the sensing electrodes 11 to 15, and the output value of the sensing electrode 15 located at the highest position is the smallest output value.

Meanwhile, when the electrode-head distance L is 70 mm as shown in FIG. 7(b), the output values of the sensing electrodes 11 to 15 have no significant differences among them. Moreover, when the electrode-head distance L is 80 mm as shown in FIG. 7(c), the output values of the sensing electrodes 11 to 15 are substantially equal values.

Here, when attention is paid to the smallest value among the output values of the sensing electrodes 11 to 15, it can be seen from FIGS. 7(a) to 7(c) that the smallest value greatly changes depending on the electrode-head distance L. Hence, the applicant has decided that when the smallest output value is equal to or larger than a predetermined threshold, the headrest position adjusting device 100 should perform a position adjusting operation, by judging that the electrode-head distance L is equal to or less than a predetermined range and hence the distance between the headrest 43 and the head 49a is adequate.

That is, the headrest position adjusting device 100 is configured to move the headrest 43 when the electrode-head distance L is equal to or less than a predetermined range and hence the smallest output value among the outputs of the sensing electrodes 11 to 15 is equal to larger than a predetermined threshold, which means that output values sufficient for calculating the height position of the head 49a are obtained. Therefore, it is possible to prevent an unnecessary movement of the headrest 43 and unnecessary power consumption which might be caused when the headrest 43 is moved in a situation where the electrode-head distance L is large and hence it is unnecessary to move the headrest 43.

Hence, it is only when the electrode-head distance L is equal to or less than a predetermined range that the headrest position adjusting device 100 according to the present example adjusts the position of the headrest 43 to an appropriate position for the head 49a by letting the arithmetic processing circuit 28 of the detecting circuit 20 use the capacitance values. It has been explained that position adjustment for the headrest 43 is performed when the smallest output value is equal to or larger than a predetermined threshold. However, it is possible to judge that the electrode-head distance L is equal to or less than a predetermined range also when, for example, the largest output value is equal to or larger than a predetermined threshold. Hence, the headrest position adjusting device 100 may be configured in the latter scheme.

Figure 8:
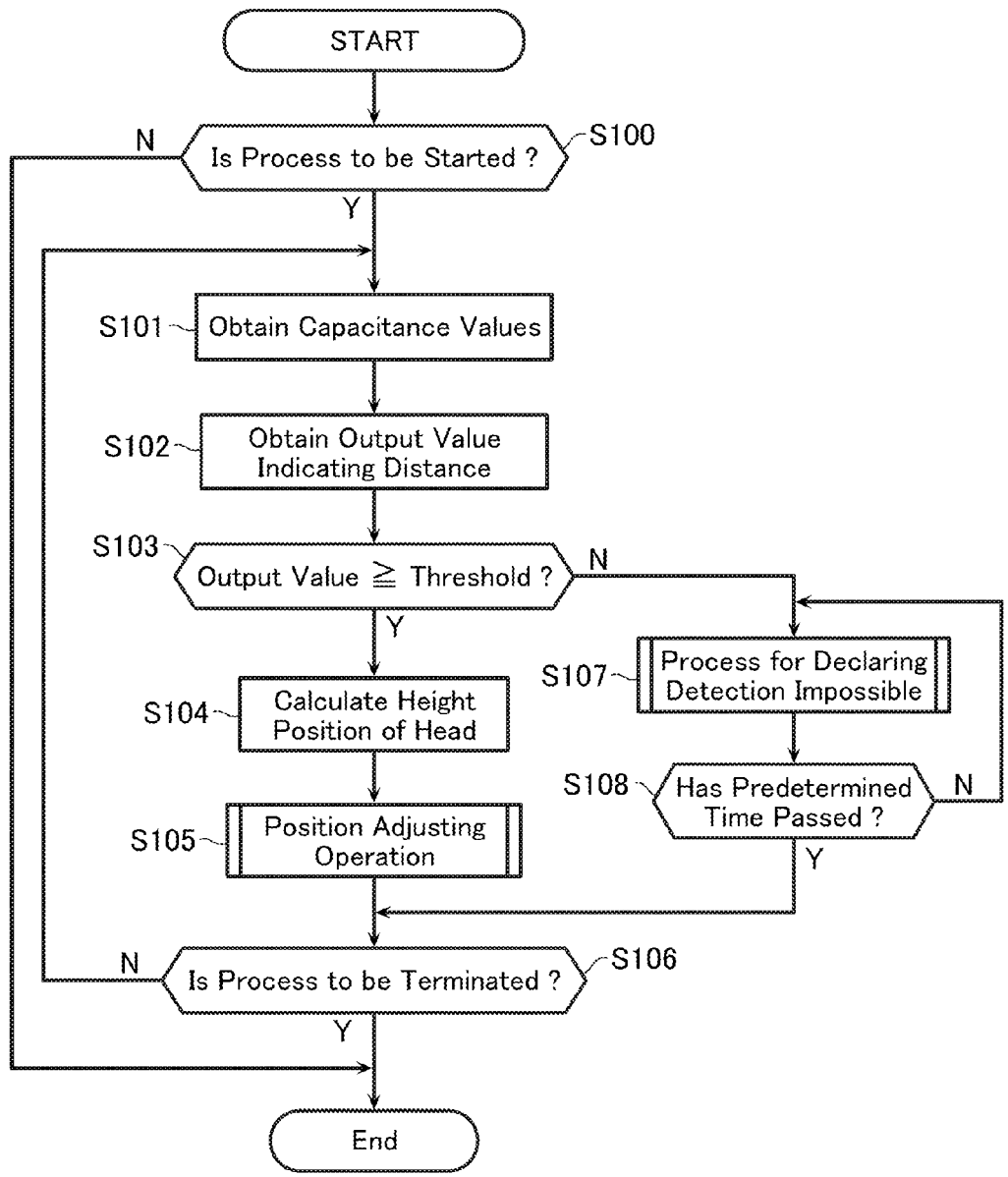
FIG. 8 is a flowchart showing an example of procedures of a position adjusting process by a headrest position adjusting method according to one embodiment of the present invention.

FIG. 8 is a flowchart showing one example of procedures of a position adjusting process by a headrest position adjusting method according to one embodiment of the present invention. This flowchart can be used when the capacitance sensor unit 10 performs position adjustment based on an output value from an unillustrated distance sensor (distance measuring means) constituted by an infrared-type sensor or an ultrasonic-type sensor. As shown in FIG. 8, first, the headrest position adjusting device 100 judges whether or not the process is to be started as triggered by, for example, an ignition switch of the vehicle being turned to an accessory state or an ON state (step S100).

When it is judged that the process is not to be started (step S100; N), the headrest position adjusting device 100 terminates the series of position adjusting process according to this flowchart. When it is judged that the process is to be started (step S100; Y), the capacitance sensor unit 10 obtains capacitance values from the plurality of sensing electrodes 11 to 15 (step S101), obtains an output value indicating a distance from the distance sensor (step S102), and judges whether or not the output value is equal to or larger than a predetermined threshold (step S103).

When it is judged that the output value is equal to or larger than the predetermined threshold (step S103; Y), the headrest position adjusting device 100 calculates the height position of the head 49a based on, for example, the obtained capacitance values (step S104), adjusts the position of the headrest back portion 43d by causing an upward-downward movement of the headrest back portion 43d based on the height position of the head 49a (step S105), and judges whether or not the process is to be terminated by, for example, the ignition switch of the vehicle being turned OFF (step S106).

When it is judged that the process is to be terminated (step S106; Y), the headrest position adjusting device 100 terminates the series of position adjusting process according to this flowchart. When it is judged that the process is not to be terminated (step S106; N), the headrest position adjusting device 100 goes to step S101 described above and repeats the subsequent process.

On the other hand, when it is judged that the output value is smaller than the predetermined threshold (step S103; N), the headrest position adjusting device 100 performs a process for declaring "detection impossible" by judging that the electrode-head distance L is too large to detect the head 49a appropriately (step S107), waits until a predetermined time passes (step S108; N), and when the predetermined time passes (step S108; Y), goes to step S106 described above.

In the process for declaring "detection impossible" in step S107 described above, the headrest position adjusting device 100 performs such a process as stopping the movement of the headrest 43 completely at the current position, or moving the headrest 43 to a predetermined position such as a preset initial position, etc. By performing the position adjusting process in this way, the headrest position adjusting device 100 can perform position adjustment for the headrest 43 with a simple configuration using a distance sensor constituted by a sensor of various types and the capacitance sensing unit 10, and prevent unnecessary power consumption by preventing an unnecessary movement.

Figure 9:
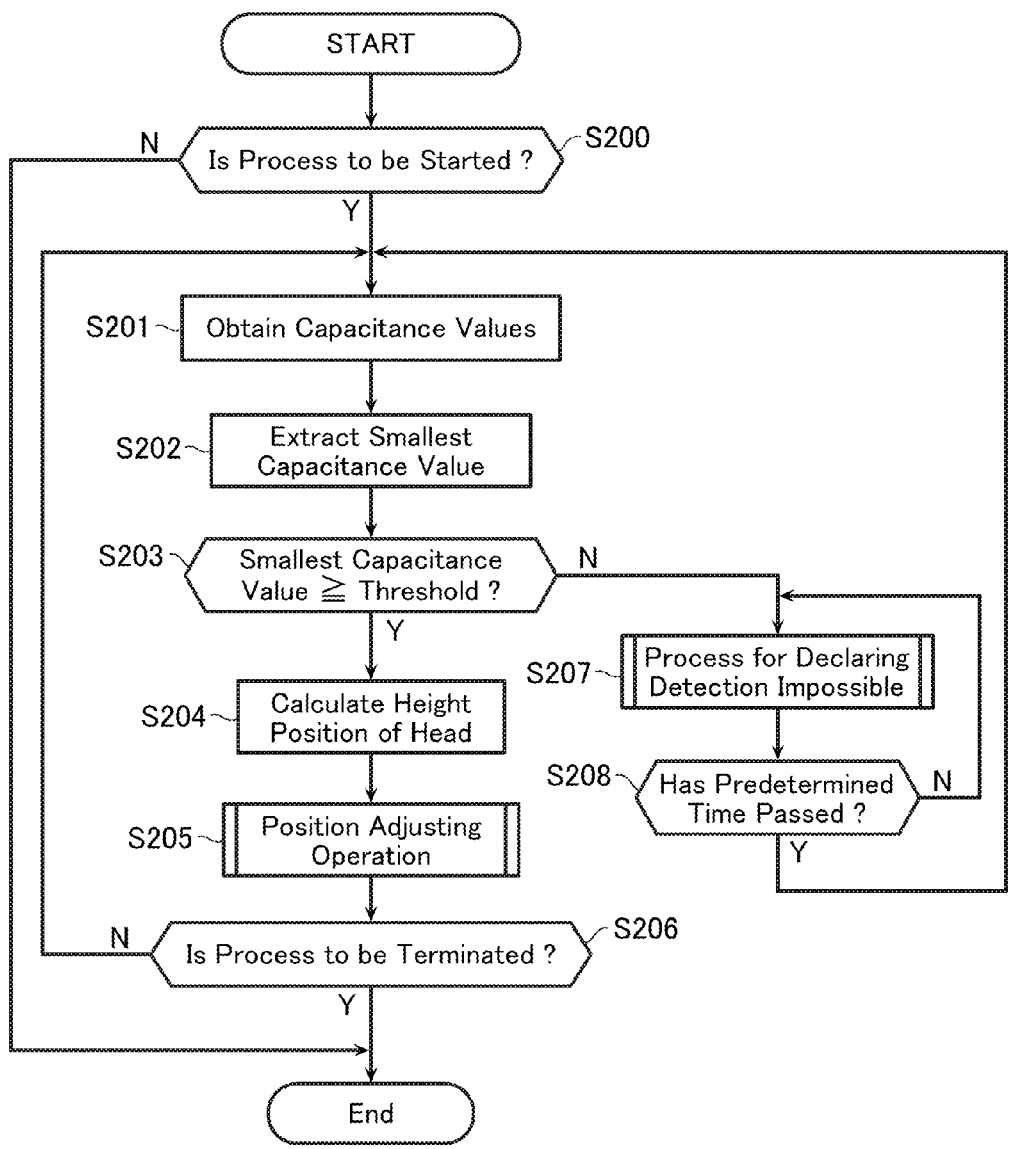
FIG. 9 is a flowchart showing another example of procedures of a position adjusting process by a headrest position adjusting method according to one embodiment of the present invention.

FIG. 9 is a flowchart showing another example of procedures of a position adjusting process by a headrest position adjusting method according to one embodiment of the present invention. This flowchart can be used when the capacitance sensor unit 10 is a capacitance-type sensor including the plurality of sensing electrodes 11 to 15. As shown in FIG. 9, the headrest position adjusting device 100 judges whether or not the process is to be started (step S200).

When it is judged that the process is not to be started (step S200; N), the headrest position adjusting device 100 terminates the series of position adjusting process according to this flowchart. When it is judged that the process is to be started (step S200; Y), the capacitance sensor unit 10 obtains capacitance values indicated by the capacitances of the sensing electrodes 11 to 15 (step S201).

Then, the arithmetic processing circuit 28 of the detecting circuit 20 extracts the smallest capacitance value indicating the smallest value among theses capacitance values (step S202), and judges whether or not the smallest capacitance value is equal to or larger than a predetermined threshold (step S203). When it is judged that the smallest capacitance value is equal to or larger than the predetermined threshold (step S203; Y), the headrest position adjusting device 100 calculates the height position of the head 49a by using the capacitance values based on the capacitances from all of the sensing electrodes 11 to 15 (step S204), and performs a position adjusting operation for the headrest back portion 43d in the height direction (step S205).

In step S104 and step S204 described above, the headrest position adjusting device 100 calculates the height position of the head 49a based on the capacitance values obtained by all of the sensing electrodes 11 to 15. For example, the headrest position adjusting device 100 calculates the position that is estimated to be the height-direction center of the head 49a (an estimated center position) by comparing these capacitance values, and calculates the height position of the head 49a based on this estimated center position.

On the other hand, when it is judged that the smallest capacitance value is smaller than the predetermined threshold (step S203; N), the headrest position adjusting device 100 performs a process for declaring "detection impossible" by stopping the movement of the headrest 43 completely at the current position or moving the headrest 43 to a predetermined position as described above (step S207), waits until a predetermined time passes (step S208; N), and when the predetermined time passes (step S208; Y), goes to step S201 described above to repeat the subsequent process.

By performing the position adjusting process in this way, the headrest position adjusting device 100 can perform position adjustment by moving the headrest back portion 43d in the upward-downward direction. Moreover, since the headrest position adjusting device 100 stops the height-direction position adjusting operation for the headrest back portion 43d when the electrode-head distance L is greater than a predetermined range (that is, when the electrodes are distanced from the head 49a), the device can as much as possible prevent the vehicle occupant (occupant) from being given discomfort by preventing an unnecessary movement of the headrest 43, and can suppress unnecessary power consumption.

DESCRIPTION OF REFERENCE NUMERALS 10 capacitance sensor unit
11 to 15 sensing electrode
19 substrate
20 detecting circuit
21 to 25 capacitance sensing circuit
26 switching circuit
27 capacitance sensing circuit
28 arithmetic processing circuit
29 harness
30 drive motor unit
40 seat
41 backrest (seat back)
42 sitting portion
43 headrest
43a support shaft
43b support shaft
43c headrest front portion
43d headrest back portion
49 human body
49a head
100 headrest position adjusting device

The invention claimed is:

1. A headrest position adjusting device, comprising:
a plurality of sensing electrodes which are provided in a headrest provided on a seat of a vehicle for sensing capacitances between a head of a human body sitting on the seat and the headrest, the sensing electrodes being provided side by side along a height direction of the headrest;
a detecting circuit which detects a height position of the head based on sensing signals from the plurality of sensing electrodes; and
position adjusting means which adjusts a position of the headrest with respect to the head based on the height position of the head in accordance with a detection result from the detecting circuit;
wherein the detecting circuit determines whether a distance between the headrest and the head is equal to or shorter than a predetermined threshold distance, and
wherein the position adjusting means adjusts the position of the headrest when the distance between the headrest and the head is determined equal to or shorter than the predetermined threshold distance, and stops the headrest or moves the headrest to a predetermined position when the distance between the headrest and the head is determined longer than the predetermined threshold distance.

2. The headrest position adjusting device according to claim 1,
wherein the detecting circuit is configured to judge that the distance between the headrest and the head is equal to or shorter than the predetermined threshold distance when a capacitance value of the sensing electrode from which a smallest capacitance value is detected among the plurality of sensing electrodes is equal to or larger than a predetermined threshold value, and judge that the distance between the headrest and the head is longer than the predetermined threshold distance when the capacitance value of the sensing electrode is smaller than the predetermined threshold value.

3. The headrest position adjusting device according to claim 1, further comprising
distance measuring means which measures the distance between the headrest and the head,
wherein the detecting circuit recognizes the distance between the headrest and the head based on a value measured by the distance measuring means.

4. The headrest position adjusting device according to claim 1,
wherein each of the sensing electrodes is formed in the headrest at a portion closer to a front surface of the headrest, and has a rectangular strip shape having its longer dimension extend in a width direction perpendicular to the height direction.

5. The headrest position adjusting device according to claim 2,
wherein each of the sensing electrodes is formed in the headrest at a portion closer to a front surface of the headrest, and has a rectangular strip shape having its longer dimension extend in a width direction perpendicular to the height direction.

6. The headrest position adjusting device according to claim 3,
wherein each of the sensing electrodes is formed in the headrest at a portion closer to a front surface of the headrest, and has a rectangular strip shape having its longer dimension extend in a width direction perpendicular to the height direction.

7. A headrest position adjusting method, comprising:
a sensing step of sensing capacitances between a head of a human body sitting on a seat of a vehicle and a headrest provided on the seat by means of a plurality of sensing electrodes which are provided in the headrest side by side along a height direction of the headrest;
a detecting step of detecting a height position of the head based on sensing signals sensed in the sensing step; and
a position adjusting step of adjusting a position of the headrest with respect to the head based on the height position of the head in accordance with a detection result detected in the detecting step,
wherein the detecting step determines whether a distance between the headrest and the head is equal to or shorter than a predetermined threshold distance, and
wherein the position adjusting step adjusts the position of the headrest when the distance between the headrest and the head is determined equal to or shorter than the predetermined threshold distance, and stops the headrest or moves the headrest to a predetermined position when the distance between the headrest and the head is determined longer than the predetermined threshold distance.

8. The headrest position adjusting method according to claim 7,
wherein the detecting step judges that the distance between the headrest and the head is equal to or shorter than the predetermined threshold distance when a capacitance value of the sensing electrode from which a smallest capacitance value is detected in the detecting step among the plurality of sensing electrodes is equal to or larger than a predetermined threshold value, and judges that the distance between the headrest and the head is longer than the predetermined threshold distance when the capacitance value of the sensing electrode is smaller than the predetermined threshold value.

9. The headrest position adjusting method according to claim 7, further comprising
a distance measuring step of measuring the distance between the headrest and the head,
wherein the detecting step recognizes the distance between the headrest and the head based on a measurement value measured in the distance measuring step.

\* \* \* \* \*